United States Patent [19]

Yamamoto

[11] Patent Number: 4,595,437
[45] Date of Patent: Jun. 17, 1986

[54] METHOD OF PRODUCING A WARMTH KEEPING VESSEL MADE OF CERAMICS OR PORCELAIN

[76] Inventor: Masashige Yamamoto, c/o Yamamoto Seisakusho Ltd., 989-3, Iwasa, Miyama-cho, Yamagata-gun, Gifu-prefecture, Japan

[21] Appl. No.: 654,788

[22] Filed: Sep. 26, 1984

[30] Foreign Application Priority Data

Nov. 21, 1983 [JP] Japan .................. 58-219280
Jul. 7, 1984 [JP] Japan .................. 59-141095

[51] Int. Cl.⁴ .................. B32B 18/00; B32B 31/26
[52] U.S. Cl. .................. 156/87; 156/89; 156/293; 215/12 A; 215/13 R; 220/421; 220/422; 220/425; 220/445; 220/446; 220/447; 220/469
[58] Field of Search .................. 156/87, 89, 293, 294; 215/12 A, 13 R; 206/542; 220/421, 422, 425, 445, 446, 447, 453, 466, 469

[56] References Cited

U.S. PATENT DOCUMENTS

| | | | |
|---|---|---|---|
| 1,995,993 | 3/1935 | Littleton | 215/13 R |
| 2,051,446 | 8/1936 | Ice | 215/13 R |
| 2,725,733 | 12/1955 | Davis | 215/13 R |
| 4,448,825 | 5/1984 | Asahara | 215/12 A |

FOREIGN PATENT DOCUMENTS

| | | |
|---|---|---|
| 51-64955 | 5/1976 | Japan . |
| 57-99917 | 6/1982 | Japan . |
| 57-148918 | 9/1982 | Japan . |

*Primary Examiner*—Caleb Weston
*Attorney, Agent, or Firm*—Pahl, Lorusso & Loud

[57] ABSTRACT

A warmth keeping ceramic or porcelaneous vessel wherein a sealed airtight hollow chamber under a reduced pressure is formed between an inner vessel and outer vessel to keep contents warm. The hollow chamber is kept airtight under a reduced pressure by an enamel bonding the joint of the inner vessel and outer vessel or closing fine holes made in either of the inner vessel and outer vessel, after heating vessels to discharge the air in the hollow chamber through the joint or the fine holes.

4 Claims, 15 Drawing Figures

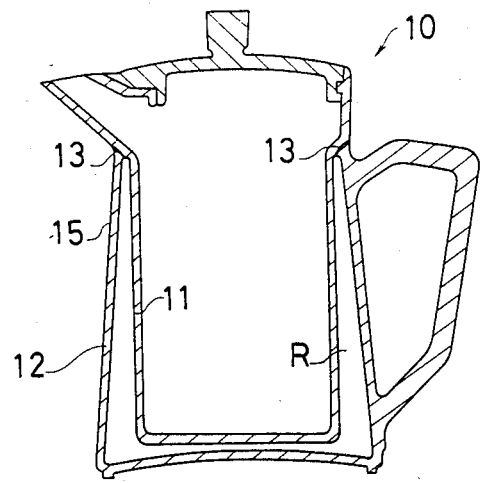
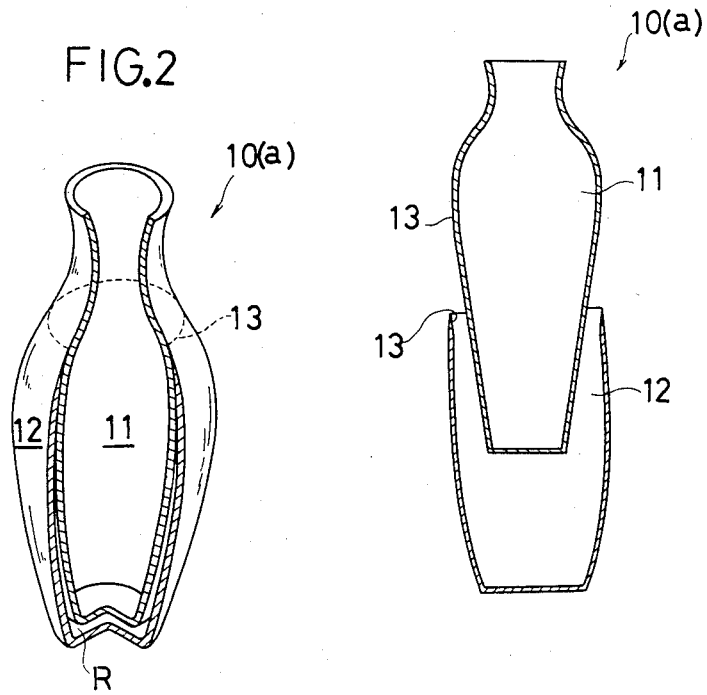

METHOD OF PRODUCING A WARMTH KEEPING VESSEL MADE OF CERAMICS OR PORCELAIN

BACKGROUND OF THE INVENTION (1) Field of the Invention

This invention relates to a warmth keeping vessel made of ceramics or porcelain and a method of producing the same.

(2) Description of the Prior Art

Vessels made of ceramics or porcelain are utilized mostly, for example, as tableware. In order to serve as tableware, it is not sufficient for them to be vessels for merely containing things. That is to say, the vessels are required to keep the temperature of foods within them to elongate the tasting time of the foods, in other words, to be able to keep warm things warm for a fixed time and to keep cold things cold for a fixed time.

Now, ceramic or porcelaneous products are so comparatively low in the warmth keeping effect that a conventional method taken to bring a warmth keeping effect is to increase the thickness of a ceramic or porcelaneous vessel itself, to preheat the vessel with hot water or the like or to keep the vessel cool in advance in a refrigerator or the like. However, it has been still insufficient to elongate the above described tasting time. In order to make it sufficient, it is thought to make a ceramic or porcelaneous vessel of a sealed double-walled structure as in a thermos bottle.

However, the ceramic or porcelaneous product is made by heating and firing kaolin above 1000 degrees. Therefore, even if an airtight hollow chamber is formed of double walls by molding kaolin in a vessel mold, when it is simply baked, air within the hollow chamber will expand due to heating and the warmth keeping ceramic or porcelaneous vessel itself will break. Thus, it has been difficult to seal a hollow chamber with heating and firing.

Therefore, there is a method wherein holes through which a hollow chamber formed of double walls communicates with the atmosphere are made in the double walls and then the vessel is fired.

In this method, air between the double walls will be replaced with the atmospheric air through the holes, heat will be exchanged and therefore the warmth keeping effect will be insufficient. In case such vessel is seen as an article, if the joint to make the double walls remains and the holes made in the double walls are conspicuous, the value as of an article will reduce.

SUMMARY OF THE INVENTION

The present invention is made in view of such circumstances as are described above and has it as an object to provide a double-walled vessel made of ceramics or porcelain and having a warmth keeping effect and a method of producing the same.

A particular object of the present invention is to provide a double-walled vessel wherein air in a hollow space between double walls made of ceramics or porcelain is discharged together with firing and then said space is sealed with an enamelso as to be an adiabatic part to be able to control the conduction of heat as much as possible and a method of producing the same.

A more particular object of the present invention is to provide a ceramic or porcelaneous vessel not only effective to keep warmth but also valuable enough as an article.

The above mentioned objects are attained by the following means and methods:

A warmth keeping vessel made of ceramics or porcelain characterized in that a ceramic or porcelaneous vessel is made of a structure having a hollow chamber kept airtight under a reduced pressure;

A method of producing a warmth keeping vessel made of ceramics or porcelain characterized in that an inner vessel and outer vessel forming a warmth keeping ceramic or porcelaneous vessel of a double-walled structure are formed of kaolin, are respectively simply baked, are overlapped on each other so as to form a hollow chamber, are then painted with an enamel on the joint of them, are heated at a temperature rather lower than the melting point of the enamel to discharge air in the hollow chamber through said joint and are further fired at a temperature higher than the melting point of said enamel so as to be bonded together to keep the hollow chamber airtight under a reduced pressure;

A method of producing a warmth keeping vessel made of ceramics or porcelain characterized in that an inner vessel and outer vessel forming a warmth keeping ceramic or porcelaneous vessel of a double-walled structure are formed of kaolin, are bonded airtightly, have fine holes made in a part of either of them, are simply baked to be well dried, are then painted with an enamel on the surfaces, are heated at a temperature rather lower than the melting point of the enamel to discharge air in the hollow chamber between them through said fine holes, are fired at a temperature higher than the melting point of said enamel, are cooled within a temperature range in which the enamel is kept molten so as to suck said enamel into said hollow chamber through said fine holes due to the pressure difference by the contraction of air in said hollow chamber and solidify the enamel and have said fine holes closed so as to keep the hollow chamber airtight under a reduced pressure.

BRIEF DESCRIPTION OF THE DRAWINGS

The drawings show warmth keeping ceramic or porcelaneous vessels embodying the present invention.

FIG. 1 is a vertically sectioned view of a pot embodying the present invention.

FIG. 2 is a partly sectioned perspective view showing a bottle embodying the present invention.

FIG. 3 is a disassembled sectioned view of the same.

DETAILED DESCRIPTION OF PREFERRED EMBODIMENTS

Figure 4:
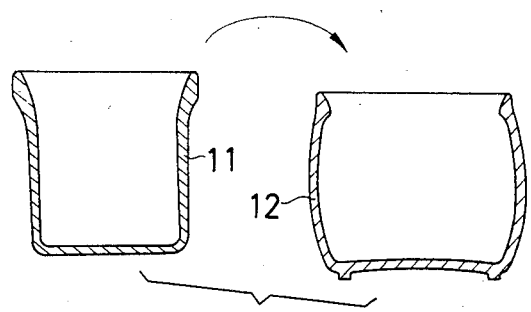
FIGS. 4 to 8 are vertically sectioned views for respectively explaining the steps of methods embodying the present invention.

The present invention shall be explained in detail in the following with reference to the embodiments shown in the drawings.

FIG. 1 shows a vertically sectioned view of a pot 10 embodying the present invention. This pot 10 is made of ceramics or porcelain and, needless to say, is painted with an enamel 15 on the surface. Further, this pot 10 is formed by bonding on the joint 13 an inner vessel 11 and outer vessel 12 as separated from each other to form a sealed airtight chamber R under a reduced pressure between the inner vessel 11 and outer vessel 12 so as to be a ceramic or porcelaneous vessel of a double-walled structure having a sealed airtight chamber under a reduced pressure.

The first producing method of the present invention is a method wherein an inner vessel 11 and outer vessel 12 forming a warmth keeping ceramic or porcelaneous vessel of a double-walled structure are formed of kaolin, are respectively simply baked, are overlapped on each other so as to form a hollow chamber, are then painted with an enamel 15 on the joint 13 of them, are heated at a temperature rather lower than the melting point of the enamel 15 to discharge air in the hollow chamber and are further fired at a temperature higher than the melting point of said enamel 15 so as to be bonded together to keep the hollow chamber airtight under a reduced pressure. That is to say, the simply baked inner vessel 11 and outer vessel 12 are overlapped on each other to form a hollow chamber, are heated at a temperature lower than the melting point of the enamel 15 to expand air in the hollow chamber and discharge it through the joint 13 of the inner vessel 11 and outer vessel 12 and are then fired at a temperature higher than the melting point of the enamel 15 to bond the joint 13 with the molten enamel.

This first producing method shall be explained more in detail with reference to the porcelaneous bottle 10a shown in FIGS. 2 and 3. This bottle-shaped vessel 10a is formed of an inner vessel 11 and an outer vessel 12. The inner vessel 11 is substantially bottle-shaped and is of a maximum diameter in the shoulder part. The outer vessel 12 is of the shape of a bottle 10a with the part above the shoulder cut off and has a barrel thicker than the above mentioned inner vessel 11. When this inner vessel 11 is overlapped into the outer vessel 12, the shoulder part of the inner vessel 11 will contact the upper peripheral edge of the outer vessel 12 and the inner vessel 11 will not be able to enter the outer vessel 12 any more. Thus, a hollow chamber is formed of the outer peripheral wall of the inner vessel 11 and the inner peripheral wall of the outer vessel 12. That is to say, the hollow chamber is formed of the outer peripheral wall of the inner vessel 11 and the inner peripheral wall of the outer vessel 12 and the inner vessel 11 and outer vessel 12 contact with each other on the opening edge of this hollow chamber and are sealed. Further, in some case, the inner vessel 11 may exactly fit in the outer vessel 12. Such inner vessel 11 and outer vessel 12 are respectively formed of ordinary kaolin for procelain and are simply baked by a normal method, are then, as required, printed with pictures and are painted with an enamel 15. This enamel 15 is an ordinary enamel of 50% feldspar, 25% silica, 15% kaolin and 10% talc. By the way, at least the outer peripheral wall of the inner vessel 11 and the inner peripheral wall of the outer vessel 12 in the joint 13 of the inner vessel 11 and outer vessel 12 are to be respectively carefully painted with the enamel 15.

After being painted with the enamel 15, as shown in FIG. 2, the outer vessel 12 and the inner vessel 11 as contained in the outer vessel 12 are fired at a temperature (of about 1000° C.) rather lower than the melting point (of about 1200° C.) of the enamel 15 for about 2 hours. As they are fired at a temperature (of about 1000° C.) lower than the melting point (of about 1200° C.) of the enamel 15, the enamel 15 will not be melted and the expanded air within the hollow chamber will be discharged through the above mentioned joint 13.

After the air within the hollow chamber is discharged, the inner and outer vessels are further heated and are fired at a temperature (of 1300° C. of an ordinary firing temperature) higher than the melting point of the enamel for 2 hours to be finished. Then, the enamel 15 will melt to bond the joint 13 of the inner vessel 11 and outer vessel 12 and seal the hollow chamber.

That is to say, the hollow chamber is kept airtight under a reduced pressure by the enamel 15 bonding the joint 13 of the inner vessel 11 and outer vessel 12.

By the way, in this embodiment, as the vessel is made of porcelain, the melting point of the enamel 15 is about 1200° C. However, in case the vessel is made of ceramics, the melting point of the enamel 15 will be lower and therefore the firing temperature will be also lower. Further, in the case of the vessel made of ceramics, the vessel itself will be mostly low in the airtightness and the inner vessel 11 and outer vessel 12 may be painted all over with the enamel to utilize the airtightness of the enamel 15 to increase the airtightness of the vessel itself.

Now, the second producing method shall be explained in the following with reference, for example, to a coffee cup 10b. First of all, as shown in FIG. 4, an inner vessel 11 and outer vessel 12 are formed of kaolin, the inner vessel 11 in a kaolin state is put into the outer vessel 12 also in a kaolin state and both are jointed airtightly with each other on a joint 13 positioned in the upper end part.

Figure 5:
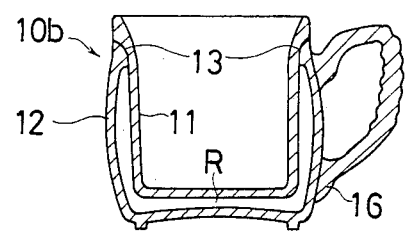
Figure 6:
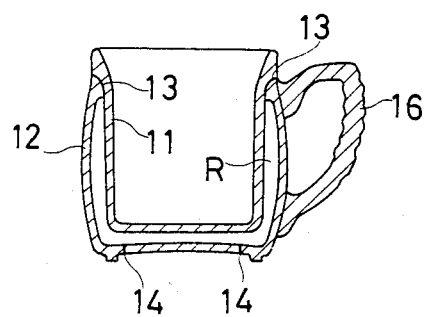

The joint 13 of the thus made inner vessel 11 and outer vessel 12 is smoothed with a sponge or cloth so as to be smooth and one or more fine holes 14 are made in a part of the outer vessel. The joint 13 of the inner vessel 11 and outer vessel 12 is smoothed with a sponge or cloth so as not to be visible in the appearance when the coffee cup 10b is completed as a product. The optimum diameter of the fine hole 14 is about 0.5 mm. according to the experiments made by the Inventors. The number of such fine holes depends on the size of the vessel itself made of ceramics or porcelain but one hole is sufficient for the size of the coffee cup 10b. If the number of the fine holes 14 is increased with the size of the vessel, the pressure within the later described airtight chamber R under a reduced pressure will be able to be well reduced. By the way, such accessory part as a handle 16 is fitted at this time. (See FIGS. 5 and 6.)

Figure 7:
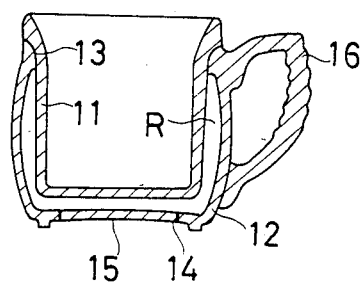

The coffee cub 10b in this state is simply baked to be well dried. This baking temperature is 700° to 800° C. After this simple baking, the coffee cup 10b is painted all over with an enamel 15. (The state in FIG. 7.)

In this case, the enamel is the same ordinary one as in the first producing method. Then this coffee cup 10b is heated for 8 to 9 minutes at such high temperature (of about 500° to 700° C.) as will not melt the enamel 15 on the surface to utilize the thermal expansion of the air within the airtight chamber R under a reduced pressure to discharge the air. Further, this coffee cup 10b is heated for 3 to 4 minutes at such temperature (of about 1200° to 1300° C.) as will melt the enamel 15. By the way, though the detailed phenomenon is not known, at this time, too, air remaining within the airtight chamber R under a reduced pressure will further expand to be discharged through the respective fine holes 14.

Figure 8:
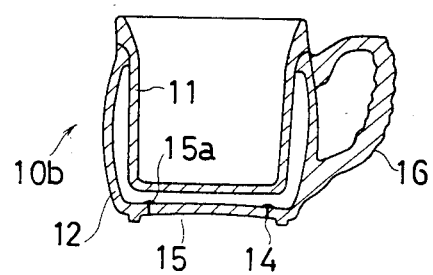

Thereafter, this coffee cup 10b is cooled gradually over at least 7 to 8 minutes so as to suck the enamel 15 molten at the beginning of this cooling into the airtight chamber R under a reduced pressure through the respective fine holes 14 with the pressure difference by the contraction of the air within the airtight chamber R under a reduced pressure. (See FIG. 8.) Thereby, the enamel 15 will close the respective fine holes 14 and a part of the enamel 15 will cover also the outside vessel 12 positioned near the insides of the respective fine holes 14. After the air within the airtight chamber R under a reduced pressure is discharged, the airtight chamber R will be closed and therefore will be literally an airtight chamber under a reduced pressure.

That is to say, the hollow chamber will be kept airtight under a reduced pressure by the enamel 15 filling the respective fine holes 14 communicating with the hollow chamber and flowing into the hollow chamber so as to be solidified.

Figure 9:
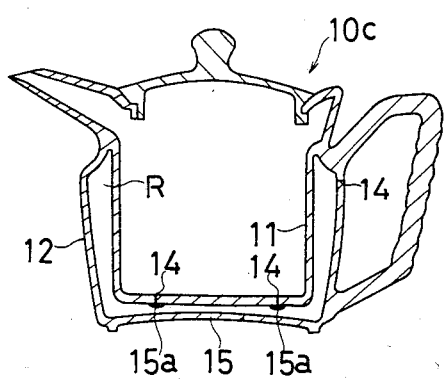
FIGS. 9 and 10 are vertically sectioned views showing other embodiments.
Figure 11:
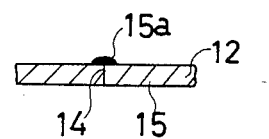
FIG. 11 is a magnified sectioned view showing a part as seen along line IX—IX in FIG. 10.
Figure 10:
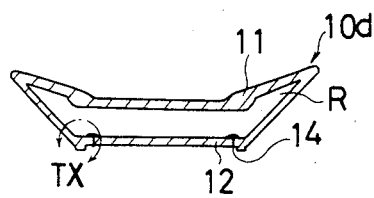

As shown in FIGS. 9 and 10, a tea pot 10c or dish 10b is also a ceramic or porcelaneous vessel having such formation as is mentioned above. Further, in the above mentioned embodiment of the second producing method, the respective fine holes 14 as formed in the outer vessel 12 have been explained. As in the tea pot 10c shown in FIG. 9, the respective fine holes 14 may be formed in the inner vessel 11. Further, if the respective fine holes 14 are provided not only in the bottom of the vessel as in the above mentioned embodiment but also, for example, in the lower part of a handle 16 of the tea pot 10c shown in FIG. 9, the fine holes 14 will be harder to see.

Figure 12:
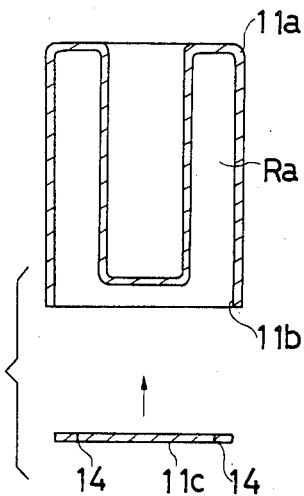
FIG. 12 is a vertically sectioned view showing another embodiment.

By the way, the present invention may be embodied not only as in the above mentioned embodiments but also, for example, as shown in FIG. 12. That is to say, an opening 11b may be formed in a vessel 11a in which a space Ra to be an airtight chamber R under a reduced pressure is formed in advance and a lid 11c may be jointed with this opening 11b and may be solidified to form a vessel.

Thus, according to the present invention, by controlling the heating time and heating temperature in the firing step in the conventional process for producing ceramic and porcelaneous products, a hollow chamber provided in a ceramic or porcelaneous product can be easily made airtight under a reduced pressure, the thermal conduction of the contents in the inner vessel 11 is comparatively slow and the preserving effect is remarkably high. That is to say, in case the temperature of the contents in the vessel is higher than the ambient temperature, the heat will be lost substantially only from the surface of the contents. This fact is very different from the fact that, in the conventional vessel, heat has been discharged and exchanged on all of the surface of the contents and the outer periphery of the vessel. Needless to say, even in case the temperature of the contents in the vessel is lower than the ambient temperature, heat will be exchanged comparatively more slowly than in the conventional vessel.

Figure 13A:
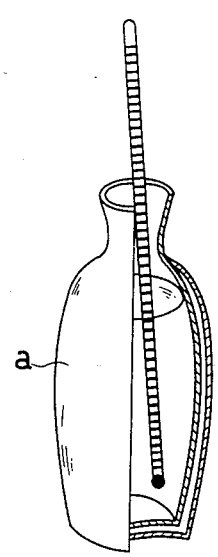
FIG. 13(A) is a partly sectioned perspective view showing a method of measuring the warmth keeping effect of the same.
Figure 13B:
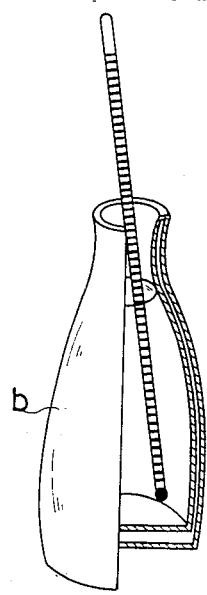
FIG. 13(B) is a partly sectioned perspective view showing a method of measuring the warmth keeping effect of a conventional bottle.
Figure 14:
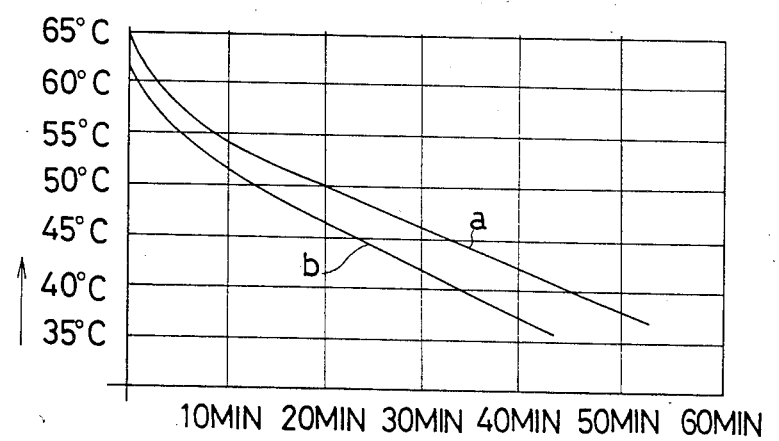
FIG. 14 is a graph showing experiment data of water temperature reduction.

For example, when the temperature variation curve (a) of the bottle 10a made by the second producing method according to the present invention and the temperature variation curve (b) of a bottle having a hollow chamber enclosing normal pressure air and made by a conventional method wherein a hollow chamber formed of double walls is provided with holes communicating with the atmosphere and is fired and then the holes are sealed were investigated as shown in FIG. 13, as a result of pouring respectively 180 cc. of warm water at a room temperature of 20° C. and hot water temperature of 65° C. and comparing the results, such temperature reduction curves as are shown in FIG. 14 were obtained. Thereby, as the temperature variation curve of the bottle 10a according to the present invention varies slowly, it is apparent that the present invention is effective enough to keep warmth.

Further, in the case by the second producing method, after the enamel 15 is perfectly melted, when the vessels are cooled, this enamel 15 will be sucked into the airtight chamber R under a reduced pressure by the pressure difference between the airtight chamber R under a reduced pressure and the outside, so to say, automatically to seal the respective fine holes 14 and cover the peripheries of the respective fine holes 14 and, by this suction, the excess enemel 15a will be sucked into the outer vessel 12.

Therefore, if the fine holes 14 are provided in the part in which the enamel 15 is likely to accumulate, the excess enamel 15a will be sucked into the airtight chamber R under a reduced pressure, therefore the parts in which the enamel 15 accumulates on the outer surface of the ceramic or porcelaneous vessel will be able to be eliminated and, when the ceramic or porcelaneous vessel is completed as an article, such fine holes 14 will not appear on the surface and therefore the value as of an article will not be reduced.

Further, if a vessel made of ceramics or porcelain is produced by this second method, the respective fine holes 14 may be only formed in advance in the inner vessel 11 or outer vessel 12 and double-walled vessel high in the warmth keeping effect will be able to be very simply and positively produced.

As detailed in the above, in the ceramic or porcelaneous vessel according to the present invention, heat is exchanged comparatively more slowly than in the conventional vessel, therefore the effect of keeping foods contained in the vessel cool or warm is very high and the time of tasting the foods can be elongated.

Also, the joint and fine holes are treated with the enamel to be beautiful and therefore the vessel is valuable enough as an article. Thus, the present invention is to provide a warmth keeping vessel having both of the advantage of ceramics or porcelain and a warmth keeping property by utilizing the conventional apparatus for producing ceramics and porcelain and is very high in the utility value particularly as of tableware vessels.

I claim:

1. A method of producing a warmth keeping vessel made of ceramics characterized in that an inner vessel and outer vessel forming a warmth keeping ceramic vessel of a double-walled structure are respectively simply baked, are overlapped on each other so as to form a hollow chamber, are then enamel bonded by the painting of an enamel on the joint formed between the inner vessel and the outer vessel, are heated at a temperature of at least 1000° C. which is sufficient to effect discharge of the air in the hollow chamber through said joint but which will not effect the melting of the enamel, and are further fired at a temperature higher than the melting point of said enamel so as to be bonded together to keep the hollow chamber air tight under a reduced pressure.

2. A method of producing a warmth keeping vessel made of ceramics characterized in that an inner vessel and outer vessel forming a warmth keeping ceramic vessel of a double-walled structure are bonded air tightly, have fine holes made in a part of either of them, are simply baked to be well dried, are then painted with an enamel on the surfaces, are heated at a temperature which is sufficient to effect the discharge of the air in the hollow chamber through said fine holes, but not to affect the melting of the enamel, are fired at a temperature higher than the melting point of said enamel, are cooled within a temperature range in which the enamel is kept molten so as to suck said enamel into said hollow chamber through said fine holes due to the pressure difference by the contraction of air in said hollow chamber and solidify the enamel and have said fine holes closed so as to keep the hollow chamber airtight under a reduced pressure.

3. A method of producing a warmth keeping vessel made of porcelain characterized in that an inner vessel and outer vessel forming a warmth keeping porcelaneous vessel of a double-walled structure are respectively simply baked, are overlapped on each other so as to form a hollow chamber, are then enamel bonded by the painting of an enamel on the joint formed between the inner vessel and the outer vessel, are heated at a temperature of at least 1000° C. but which is below the melting point of the enamel, sufficient to effect discharge of the air in the hollow chamber through said joint but not to melt the enamel, and are further fired at a temperature higher than the melting point of said enamel so as to be bonded together to keep the hollow chamber airtight under a reduced pressure.

4. A method of producing a warmth keeping vessel made of porcelain characterized in that an inner vessel and outer vessel forming a warmth keeping porcelaneous vessel of a double-walled structure are bonded air tightly, have fine holes made in a part of either of them, are simply baked to be well dried, are then painted with an enamel on the surfaces, are heated at a temperature of at least 1000° C. but which is below the melting point of the enamel, sufficient to effect the discharge of the air in the hollow chamber through said fine holes but not to cause the enamel to melt, are fired at a temperature higher than the melting point of said enamel, are cooled within a temperature range in which the enamel is kept molten so as to suck said enamel into said hollow chamber through said fine holes due to the pressure difference by the contraction of air in said hollow chamber and solidify the enamel and have said fine holes closed so as to keep the hollow chamber airtight under a reduced pressure.

* * * * *